(12) United States Patent
Janson et al.

(10) Patent No.: US 7,044,014 B2
(45) Date of Patent: May 16, 2006

(54) DUAL CLUTCH AUTOMATIC TRANSAXLE

(75) Inventors: David Janson, Plymouth, MI (US); Reid Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 10/853,094

(22) Filed: May 25, 2004

(65) Prior Publication Data

US 2005/0262956 A1 Dec. 1, 2005

(51) Int. Cl.
*F16H 3/08* (2006.01)

(52) U.S. Cl. ............................ 74/331; 74/330; 74/339; 74/340

(58) Field of Classification Search .................. 74/330, 74/331, 340, 339
See application file for complete search history.

(56) References Cited

U.S. PATENT DOCUMENTS

| | | | |
|---|---|---|---|
| 2,616,301 A | 11/1952 | Tourneau | |
| 3,589,483 A * | 6/1971 | Smith | ......................... 192/3.52 |
| 3,916,711 A * | 11/1975 | Hoyer | ......................... 74/360 |
| 4,245,519 A | 1/1981 | Herlitzek | |
| 4,392,391 A | 7/1983 | Jameson et al. | |
| 4,428,247 A | 1/1984 | Young | |
| 4,549,443 A | 10/1985 | White | |
| 4,580,459 A * | 4/1986 | Zenker et al. | ................. 74/359 |
| 4,823,639 A | 4/1989 | Krause et al. | |
| 5,471,892 A | 12/1995 | Sherman | |
| 5,524,500 A | 6/1996 | Rebholz et al. | |
| 5,743,142 A | 4/1998 | Leber et al. | |
| 5,787,756 A | 8/1998 | Leber et al. | |
| 5,819,587 A | 10/1998 | Leber et al. | |
| 6,513,399 B1 | 2/2003 | Lamela | |
| 6,958,028 B1 * | 10/2005 | Janson et al. | ................ 475/207 |
| 2003/0015050 A1 | 1/2003 | Huber et al. | |
| 2003/0131686 A1 | 7/2003 | Huber | |
| 2003/0136209 A1 | 7/2003 | Huber | |
| 2005/0193846 A1 * | 9/2005 | Eggert et al. | .................. 74/331 |

FOREIGN PATENT DOCUMENTS

| | | | |
|---|---|---|---|
| EP | 602750 A2 * | 6/1994 | |
| EP | 1 439 323 | 7/2004 | |
| GB | 1060486 | 9/1962 | |
| JP | 61236948 A * | 10/1986 | |

* cited by examiner

*Primary Examiner*—Charles A. Marmor
*Assistant Examiner*—David D. Le
(74) *Attorney, Agent, or Firm*—David B. Kelley; MacMillan Sobanski & Todd

(57) ABSTRACT

A multiple speed transaxle includes first and second input shafts, first and second output shafts, a layshaft, an idler shaft, a first set of selectable torque paths between the first input shaft and first output shaft, a second set of selectable torque paths between the second input shaft and the second output shaft, the second set including the layshaft and idler shaft, and a selectable torque path between the first input shaft and second output shaft including the layshaft and idler shaft.

10 Claims, 5 Drawing Sheets

| Gear/Pinion | No. of teeth |
|---|---|
| 36 | 42 |
| 40 | 41 |
| 34 | 21 |
| 38 | 46 |
| 44 | 29 |
| 50 | 32 |
| 42 | 33 |
| 46 | 38 |
| 52 | 50 |
| 56 | 49 |
| 48 | 42 |
| 60 | 25 |
| 54 | 25 |
| 58 | 50 |
| 62 | 65 |
| 64 | 58 |
| 28 | 30 |
| 24 | 26 |
| 25 | 110 |

*Figure 3*

| Gear | Torque Ratio | Step |
|---|---|---|
| 1st | 13.81 | |
| 2nd | 8.46 | 1.63 |
| 3rd | 5.42 | 1.56 |
| 4th | 3.77 | 1.44 |
| 5th | 2.66 | 1.42 |
| 6th | 2.06 | 1.29 |
| Rev | -12.32 | |

*Figure 4*

| Gear / Pinion | No. of teeth |
|---|---|
| 36 | 52 |
| 40 | 27 |
| 34 | 20 |
| 38 | 27 |
| 44 | 21 |
| 98 | 23 |
| 94 | 21 |
| 46 | 27 |
| 52 | 36 |
| 56 | 24 |
| 48 | 33 |
| 60 | 20 |
| 54 | 20 |
| 58 | 29 |
| 62 | 56 |
| 64 | 45 |
| 90 | 51 |
| 92 | 31 |
| 28 | 30 |
| 24 | 25 |
| 25 | 120 |

*Figure 6*

| Gear | Torque Ratio | Step |
|---|---|---|
| 1st | 17.60 | |
| 2nd | 12.48 | 1.41 |
| 3rd | 7.60 | 1.64 |
| 4th | 4.80 | 1.58 |
| 5th | 3.49 | 1.37 |
| 6th | 2.71 | 1.29 |
| 7th | 2.11 | 1.28 |
| Rev | -14.14 | -0.80 |

| Span | 8.32 |
|---|---|

DUAL CLUTCH AUTOMATIC TRANSAXLE

BACKGROUND OF THE INVENTION

This invention relates to automatic transmissions having a layshaft kinematic arrangement, particularly to automatic transaxles having dual input clutches, but no torque converter.

Automatic transmissions for transmitting power between an input and an output, either over a continuously variable range of speed ratios or in discrete step changes among speed ratios, have associated with them several sources of parasitic losses, which adversely affect fuel economy. These losses are associated with a torque converter, open hydraulic friction clutches and brakes, hydraulic pump, and gear meshes.

To improve fuel economy in a motor vehicle having an automatic transmission, an automated shift manual (ASM) transmission can be used to eliminate or substantially reduce all of these parasitic losses except gear mesh losses. An ASM transmission generally performs gear ratio changes by first interrupting torque transmitted from the engine to the transmission input, preparing the transmission components associated with the next speed ratio, and then restoring torque at the input. A primary functional feature of ASM transmissions is the need to interrupt power transmitted from the engine to the transmission input shaft before or during each gear ratio change.

Dual clutch layshaft transmissions are essentially two ASM transmissions, one providing odd numbered gears and one providing even numbered gears. Shifts between odd numbered gears and even numbered gears can be accomplished without interrupting power flow. While operating in an odd numbered gear, couplers can be actuated to configure the transmission for the next even numbered gear. Dual clutch transmissions have parasitic losses only slightly higher than ASM transmissions.

Motor vehicles, in which the front wheels are the driven wheels and the engine and transmission are located in a forward engine compartment, generally require the engine and transmission to be arranged in a space whose lateral dimension is limited by the spacing between the front wheels. The engine compartments of such vehicles are both narrow and short. When the engine is also of the type having six in-line cylinders, there is an acute need to minimize the package space occupied by the transaxle, particularly its lateral dimension, in order to conserve space for long engines.

SUMMARY OF THE INVENTION

A transaxle according to this invention is a layshaft transaxle having dual friction clutches and two final drive pinions. The sixth forward drive gear is located on an idler shaft, which transmits torque to an output shaft associated with particular gear ratios, e.g., odd-numbered gear ratios. A driving gear for the fifth gear ratio is also an idler gear for the sixth gear ratio. Producing the sixth gear in this way allows a substantial reduction in length of the transaxle.

It is an advantage of this invention that the axial dimension of the transaxle, its lateral dimensions when installed in the vehicle, is reduced sufficiently to accommodate an I6 engine in the engine compartment. It is another advantage that its longitudinal dimension, as installed, provides sufficient space for V6 engines in the engine compartment.

A multiple speed transaxle according to this invention includes first and second input shafts, first and second output shafts, a layshaft, an idler shaft, a first set of selectable torque paths between the first input shaft and first output shaft, a second set of selectable torque paths between the second input shaft and the second output shaft, the second set including the layshaft and idler shaft, and a selectable torque path between the first input shaft and second output shaft, the torque path including the layshaft and the idler shaft.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a chart containing a preferred number of teeth for each of the gears and pinions of the transmission of FIG. 2;

FIG. 4 is a chart containing the torque ratios between the input and output and steps between the torque ratios for each of the forward speeds and reverse drive of the transmission of FIG. 2, the gears and pinions having the number of teeth shown in FIG. 3.

FIG. 6 is a chart containing a preferred number of teeth for each of the gears and pinions of the transmission of FIG. 5; and FIG. 7 is a chart containing the torque ratios between the input and output and steps between the torque ratios for each of the forward speeds and reverse drive of the transmission of FIG. 5, the gears and pinions having the number of teeth shown in FIG. 6.

DETAILED DESCRIPTION OF THE PREFERRED EMBODIMENT

Figure 1:
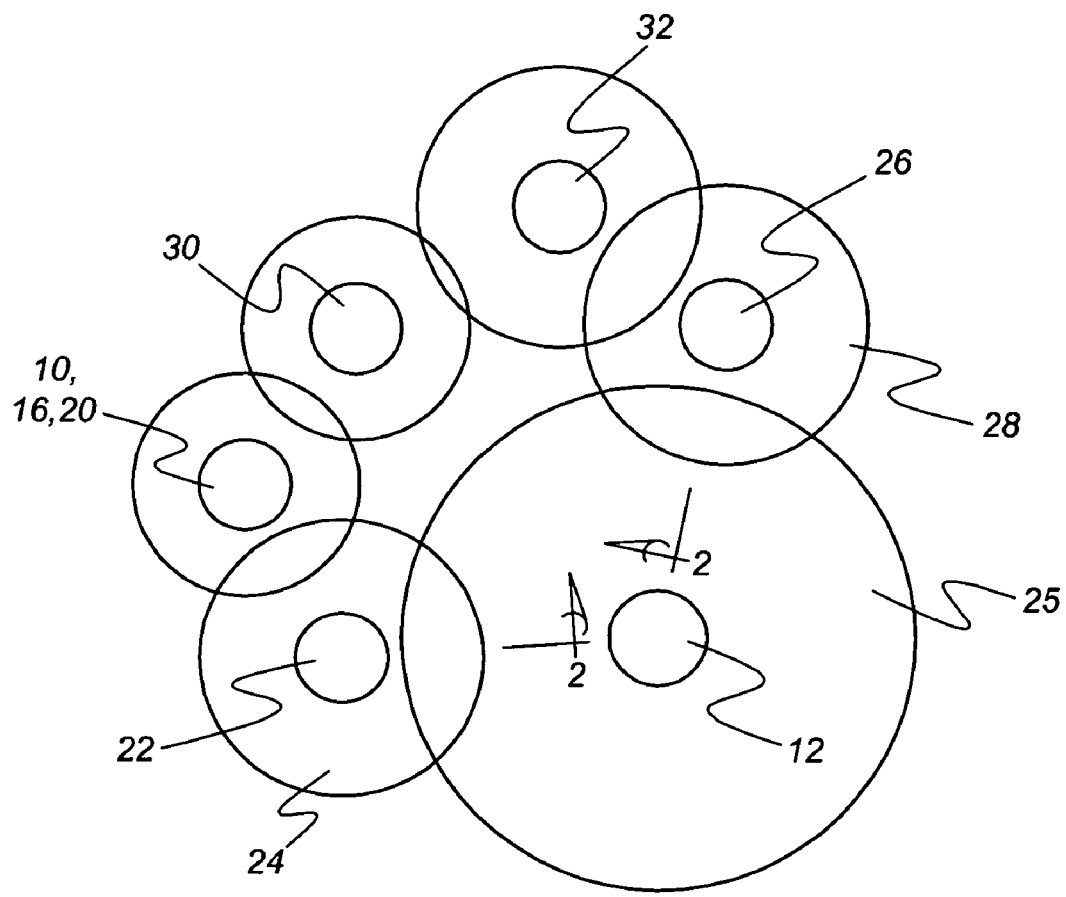
FIG. 1 is a schematic diagram showing an end view of a transmission according to the present invention.
Figure 2:
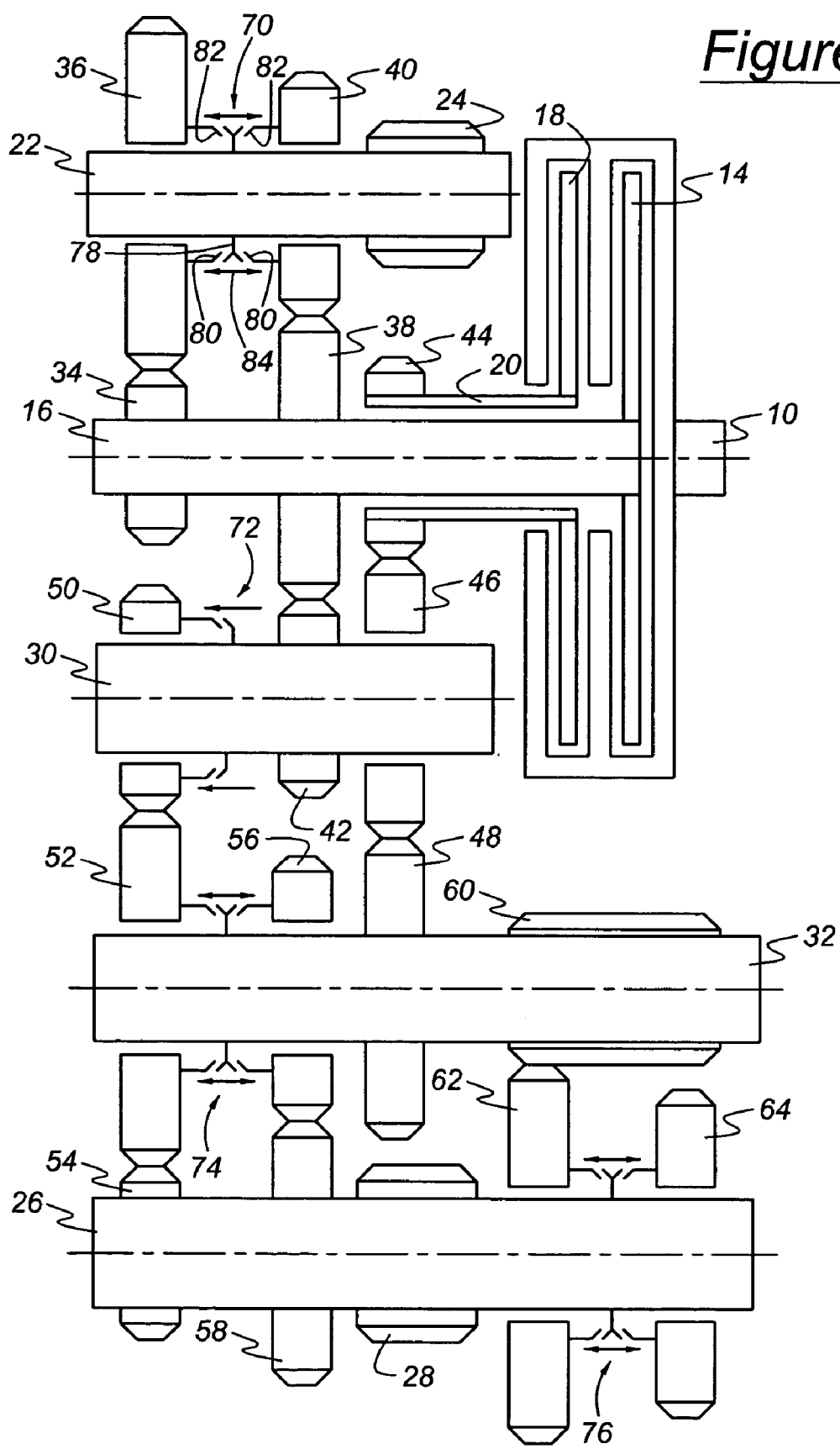
FIG. 2 is a cross section taken at planes 2—2 of FIG. 1 showing the kinematic gear arrangement of a transmission having six forward speeds.

Referring to FIGS. 1 and 2, a transmission according to the present invention includes an input 10 for driveably connecting a power source, such as an internal combustion engine or electric motor, to the transmission, and an output 12 for driving a load, such as the driven wheels of a motor vehicle, through a powertrain that may include a drive shaft, differential mechanism, and axle shafts. A first friction clutch 14, consisting of a clutch housing and a clutch disc, alternately connects and disconnects a first input shaft 16 as clutch 14 is engaged and disengaged, respectively. A second friction clutch 18, consisting of a clutch housing and a clutch disc, connects and disconnects a second input shaft 20 as clutch 18 is engaged and disengaged, respectively.

A first output shaft 22 supports a first output pinion 24, which is secured to shaft 22 in continuous meshing engagement with an output gear 25, secured to output 12. A second output shaft 26 supports a second output pinion 28, which is secured to the shaft in continuous meshing engagement with output gear 25. An idler shaft 30 and layshaft 32 are arranged substantially parallel to the other shafts 16, 20 22 and 26.

First pairs of mutually engaged pinions and gears include a pinion 34, secured to input shaft 16 and engaged with gear 36, which is supported on shaft 22 for rotation relative to shaft 22. A pinion 38, secured to input shaft 16, is engaged with gear 40 and with gear 42, which is secured to idler shaft 30. Gear 40 is supported on shaft 22 for rotation relative thereto. A pinion 44, secured to input shaft 20, is engaged with idler gear 46, which is supported on idler shaft 30 for rotation relative to shaft 30 and is engaged with gear 48, which is secured to layshaft 32.

A pinion 50, which is supported on idler shaft 30 for rotation relative to shaft 30, is engaged with gear 52, which is supported on layshaft 32 for rotation relative to shaft 32.

Second pairs of mutually engaged pinions and gears include gear 52, engaged with gear 54, which is secured to output shaft 26. A pinion 56, which is supported on layshaft 32 for rotation relative to shaft 32, is engaged with gear 58, which is secured to output shaft 26. A pinion 60, secured to layshaft 32, is engaged with gear 62, which is supported on output shaft 26 for rotation relative to shaft 26. A reverse output gear 64 is supported on output shaft 26 for rotation relative to shaft 26.

A reverse idler gear (not shown) is continually meshing with pinion 60 and reverse output gear 64, thereby providing an additional mesh so that the direction of rotation of gear 64 is opposite the direction of rotation of the other output gears 36, 40, 54, 58, 62 when reverse drive is selected.

Couplers 70, 72, 74 and 76 are preferably synchronizers of the type used in automotive manual transmissions to connect a gear or pinion to a shaft, after synchronizing the speed of the shaft and that of the pinion or gear. Each coupler also disconnects the shaft and the associated pinion or gear. An example of such a synchronizer is disclosed in U.S. Pat. No. 4,222,281. Alternatively, each coupler may be a toothed clutch having dogteeth that are engaged with clutch teeth on a gear or pinion. This invention may use couplers in any combination of synchronizers and dog clutches. Each coupler is secured by a hub to a shaft. For example, coupler 70 is secured by hub 78 to output shaft 22 for rotation with output shaft 22.

In the case where a coupler is a synchronizer, it is provided with a conical surface 80 on a blocker ring, located adjacent the hub 78 and supported for axial displacement. The conical surface on each blocker ring engages with a corresponding conical surface 82 located on a gear 36, 40 located adjacent the blocker ring. Each synchronizer includes a sleeve 84, supported on the hub 78 for axial displacement leftward and rightward from the positions shown in FIG. 2. When the sleeve 84 is displaced axially causing the synchronizer 70 to engage either of its adjacent gears 36, 40, the conical surface 80 on a blocker ring is forced into frictional contact with a conical surface 82 on the gear. This frictional engagement synchronizes the speed of the gear with that of the shaft 22. When the rotational speeds of the shaft and gear are synchronized, further axial displacement of the sleeve 84 causes dog teeth on the radially inner surface of the sleeve to engage dog teeth carried on the adjacent gear. When the dog teeth of the sleeve engage those of the gear, the shaft 22 is driveably connected to the gear.

In the case where a coupler is a dog clutch, displacement of the sleeve 84 in opposite axial directions causes mutual engagement of dog teeth formed on the sleeve with dog teeth carried on the gear, such that a drive connection is made between the shaft and the gear, but without first synchronizing the rotational speed of the shaft with the speed of the gear.

In FIG. 2, the couplers 70–76 are shown in a neutral position, between the left-hand and right-hand extremities of travel of the connecting sleeve, whose engagement with dog teeth carried on the gear completes the drive connection to the shaft. The hubs of couplers 70, 76 are rotatably secured to output shafts 22 and 26, respectively; the hub of coupler 72 is rotatably secured to idler shaft 30; the hub of coupler 74 is secured to layshaft 32.

Coupler 70, located between gears 36, 40, releasably connects alternately those gears to output shaft 22, and coupler 70 may be disengaged from both gears 36, 40. Coupler 74, located between gears 52, 56, releasably connects alternately those gears to layshaft 32, and coupler 74 disengages those gears from shaft 32. Coupler 76, located between gears 62, 64, releasably connects alternately those gears to second output shaft 26, and coupler 76 disengages those gears from shaft 26. Coupler 72, located between gears 50, 42, releasably connects and disconnects only gear 50 and idler shaft 30.

To produce the first forward speed, clutch 18 is engaged, and the selector sleeve of coupler 76 is displaced leftward to connect gear 62 and output shaft 26 mutually. Input 10 is driveably connected to shaft 20 through clutch 18, causing pinion 44 to drive gear 48 and layshaft 32 through idler gear 46. Pinion 60 drives gear 62, which is driveably connected to output shaft 26 through coupler 76. Output pinion 28 drives output 12 due to its engagement with output gear 25.

The second forward speed results by disengaging coupler 76, sliding the selector sleeve of coupler 70 leftward to connect gear 36 to output shaft 22, disengaging friction clutch 18, and engaging clutch 14. Input 10 is driveably connected to input shaft 16 through clutch 14, causing pinion 34 to drive gear 36, which drives output shaft 22 through coupler 70. Output pinion 24 drives output 12 due to its engagement with output gear 25.

The third forward speed results by disengaging coupler 70, sliding the selector sleeve of coupler 74 rightward to connect pinion 56 to layshaft 32, disengaging friction clutch 14, and engaging clutch 18. Input 10 is driveably connected to input shaft 20 through clutch 18, causing pinion 44 to drive gear 48 and layshaft 32 through idler gear 46. Gear 48 drives layshaft 32 and pinion 56 through coupler 74. Pinion 56 drives gear 58 and output shaft 26. Output pinion 28 drives output 12 due to its engagement with output gear 25.

The fourth speed results by disengaging coupler 74, sliding the selector sleeve of coupler 70 rightward to connect gear 40 to output shaft 22, disengaging friction clutch 18, and engaging clutch 14. Input 10 is driveably connected to input shaft 16 through clutch 14, causing pinion 38 to drive gear 40, which drives output shaft 22 through coupler 70. Output pinion 24 drives output 12 due to its engagement with output gear 25.

The fifth speed results by disengaging coupler 70, sliding the selector sleeve of coupler 74 leftward to connect pinion 52 to layshaft 32, disengaging friction clutch 14, and engaging clutch 18. Input 10 is driveably connected to input shaft 20 through clutch 18, causing pinion 44 to drive gear 48 and layshaft 32 through idler gear 46. Gear 48 drives layshaft 32 and pinion 52 through coupler 74, and pinion 52 drives gear 54 and output shaft 26. Output pinion 28 drives output 12 due to its engagement with output gear 25.

The sixth speed results by disengaging coupler 74, sliding the selector sleeve of coupler 72 leftward to connect pinion 50 to idler shaft 30, disengaging friction clutch 18, and engaging clutch 14. Input 10 is driveably connected to input shaft 16 through clutch 14, causing pinion 38 to drive gear 42, which drives idler shaft 30 and pinion 50 through coupler 72. Pinion 50 drives gear 54 through gear 52, which, for sixth gear operation, functions as an idler. Gear 54 drives output shaft 26. Output pinion 28 drives output 12 due to its engagement with output gear 25.

The output 12 is driven in the reverse direction by sliding the selector sleeve of coupler 76 rightward to connect gear 64 to output shaft 26, and engaging friction clutch 18. Input 10 is driveably connected to input shaft 20 through clutch 18, causing pinion 44 to drive gear 48 and layshaft 32 through idler 46. Pinion 60 is driveably connected to reverse output gear 64, which drives output shaft 26 through coupler 76. Output pinion 28 drives output 12 due to its engagement with output gear 25.

Figure 5:
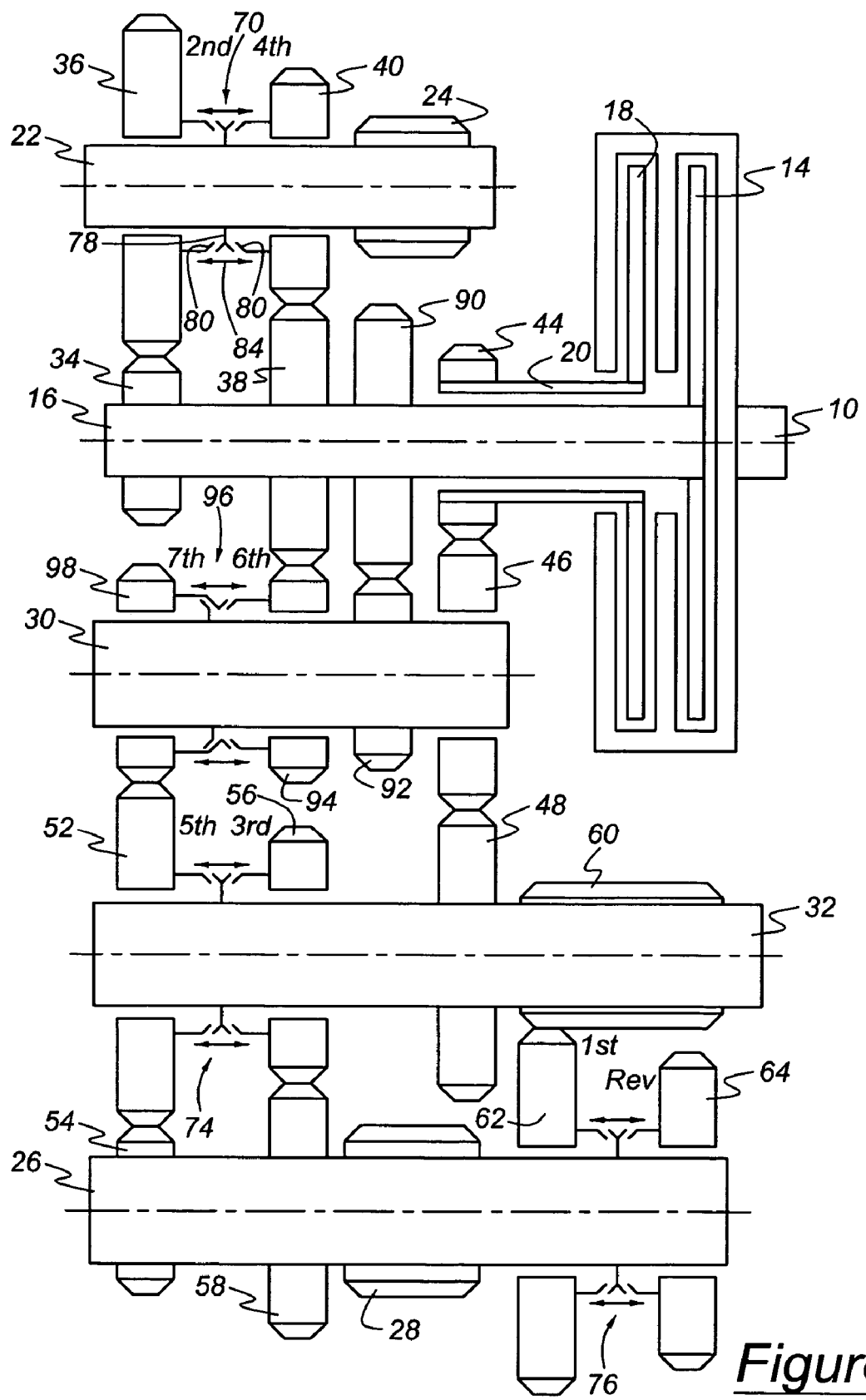
FIG. 5 is a cross section taken at planes 2—2 of FIG. 1 showing the kinematic gear arrangement of a transmission having seven forward speeds.

Refer now to the kinematic arrangement of the seven speed transmission of FIG. 5, which adds to the arrangement of FIG. 2 a third pinion 90 secured to input shaft 16, and a second forward drive gear 92, supported on idler shaft 30 and engaged with the pinion 90. The first forward drive gear 94 is supported on idler shaft 30, but it is not secured to shaft 30.

The coupler 96, which replaces coupler 72, includes a hub that is secured to forward drive pinion 98, rather than being secured to idler shaft 30. Moving the selector sleeve of coupler 96 rightward from the neutral position driveably connects pinion 98 and gear 94; moving that sleeve leftward driveably connects pinion 98 and idler shaft 30.

The first five forward speeds and reverse drive of the transmission of FIG. 5 are produced identically as described with reference to FIG. 2. The sixth speed results by sliding the selector sleeve of coupler 96 rightward to connect pinion 98 and gear 94, disengaging clutch 18, and engaging clutch 14. Input 10 is driveably connected to input shaft 16 through clutch 14, causing pinion 38 to drive gear 94, which drives pinion 98 through coupler 96. Pinion 98 drives gear 54 through gear 52, which, for sixth and seventh gear operation, functions as an idler. Gear 54 drives output shaft 26. Output pinion 28 drives output 12 due to its engagement with output gear 25.

The seventh speed results by disengaging clutch 14, sliding the selector sleeve of coupler 96 leftward to connect pinion 98 and idler shaft 30, and re-engaging clutch 14. Input 10 is driveably connected to input shaft 16 through clutch 14, causing pinion 90 to drive gear 92, which drives idler shaft 30 due to gear 92 being secured to shaft 30. Coupler 96 driveably connects idler shaft 30 and pinion 98, which drives gear 54 through idler gear 52. Gear 54 drives output shaft 26. Output pinion 28 drives output 12 due to its engagement with output gear 25.

An upshift from sixth to seventh gear, unlike all other single step shifts, requires a torque break, i.e., the torsional connection between the input 10 and output 25 is briefly interrupted by disengaging clutch 14 while the state of coupler 96 is changed. This is mitigated because the 6–7 upshift is never made at high throttle; instead, it usually occurs as a result of the driver reducing power demand when reaching cruising speed. Downshifts inherently involve an output torque reduction, even for powershift transmissions, because some of the engine torque must be used to increase the engine speed. Double step shifts, such as those from fifth gear to seventh gear, and from seventh gear to fifth gear can be performed without interrupting torque.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A multiple speed transaxle for motor vehicles, comprising:
    an input;
    first and second input shafts;
    a first clutch driveably connected to the input and the first input shaft for driveably connecting and disconnecting the input and the first input shaft;
    a second clutch driveably connected to the input and the second input shaft for driveably connecting and disconnecting the input and the second input shaft;
    first and second output shafts;
    first pairs of mutually engaged pinions and gears, a pinion of each first pair being located on the first input shaft, a gear of each first pair being located on the first output shaft;
    a first coupler for driveably connecting the first input shaft and first output shaft through a selected first pair;
    an idler shaft;
    a layshaft;
    a gearset including a pinion secured to the second input shaft, an idler gear rotatably supported on the idler shaft and engaged with said pinion, and a gear secured to the layshaft and engaged with the idler gear;
    second pairs of mutually engaged pinions and gears, a member of each second pair being located on the layshaft, another member of each second pair being located on the second output shaft;
    a second coupler for driveably connecting the layshaft and the second output shaft through a selected second pair;
    a forward drive gear secured to the idler shaft and engaged with a pinion of a first pair;
    a forward drive pinion rotatably supported on the idler shaft and engaged with a member of a second pair located on the layshaft; and
    a third coupler for driveably connecting and disconnecting the forward drive pinion and the idler shaft.

2. The transaxle of claim 1, further comprising:
    a fourth coupler for driveably connecting the layshaft and the second output shaft through a selected second pair.

3. The transaxle of claim 1, further comprising:
    a first output pinion secured to the first output shaft;
    a second output pinion secured to the second output shaft;
    an output; and
    an output gear secured to the output for rotation therewith, and driveably connected to the first output pinion secured output pinion.

4. The transaxle of claim 1, wherein the second pairs further comprise:
    a fifth pinion secured to the layshaft;
    a fifth gear rotatably supported on the second output shaft and engaged with the fifth pinion, the fifth pinion and fifth gear producing a fifth ratio of a speed of the layshaft and a speed of the second output shaft; and
    a sixth gear rotatably supported on the second output shaft and driveably connected to the fifth pinion.

5. The transaxle of claim 4, further comprising:
    a fourth coupler secured to the second output shaft, located between the fifth gear and the sixth gear, for driveably connecting the fifth gear and the sixth gear alternately to the second output shaft, and disconnecting the drive connections of the fifth gear and the sixth gear to the second output shaft.

6. The transaxle of claim 1, wherein:
    the input, the first and second input shafts, and the first and second clutches are mutually coaxial; and
    the first and second output shafts, layshaft and idler shaft are mutually parallel, and parallel to a axis of the input, the first and second input shafts, and the first and second clutches.

7. The transaxle of claim 1, further comprising a forward drive pinion rotatably supported on the idler shaft; and wherein the second pairs further comprise:
- a third pinion rotatably supported on the layshaft and engaged with the forward drive pinion;
- a fourth pinion rotatably the layshaft and spaced axially from the third pinion;
- a third gear secured to the second output shaft and engaged with the third pinion, the third pinion and third gear producing a third ratio of a speed of the layshaft and a speed of the second output shaft; and
- a fourth gear secured to the second output shaft and engaged with the fourth pinion, the fourth pinion and fourth gear producing a fourth ratio of a speed of the layshaft and a speed of the second output shaft.

8. The transaxle of claim 7, wherein the second coupler is secured to the layshaft, is located between the third pinion and the fourth pinion, driveably connects the third pinion and the fourth pinion alternately to the layshaft, and disconnects the drive connections of the third pinion and fourth pinion to the layshaft.

9. The transaxle of claim 1, wherein the first pairs further comprise:
- a first pinion secured to the first input shaft;
- a second pinion secured to the first output shaft and spaced axially from the first pinion;
- a first gear supported on the first output shaft and engaged with the first pinion, the first pinion and first gear producing a first ratio of a speed of the first input shaft and a speed of the first output shaft output shaft; and
- a second gear supported on the first output shaft and engaged with the second pinion, the second pinion and second gear producing a second ratio of a speed of the first input shaft and a speed of the first output shaft.

10. The transaxle of claim 9, wherein the first coupler is secured to the first output shaft, is located between the first gear and the second gear, driveably connects the first gear and second gear alternately to the first output shaft, and disconnects the drive connections of the first gear and second gear to the first output shaft.

* * * * *